Sept. 17, 1935. D. D. GOLDBERG Re. 19,703

VALVE

Original Filed June 21, 1928 4 Sheets-Sheet 1

Inventor
David D. Goldberg
By Walter M. Tubby
Atty.

Sept. 17, 1935. D. D. GOLDBERG Re. 19,703
VALVE
Original Filed June 21, 1928 4 Sheets-Sheet 2
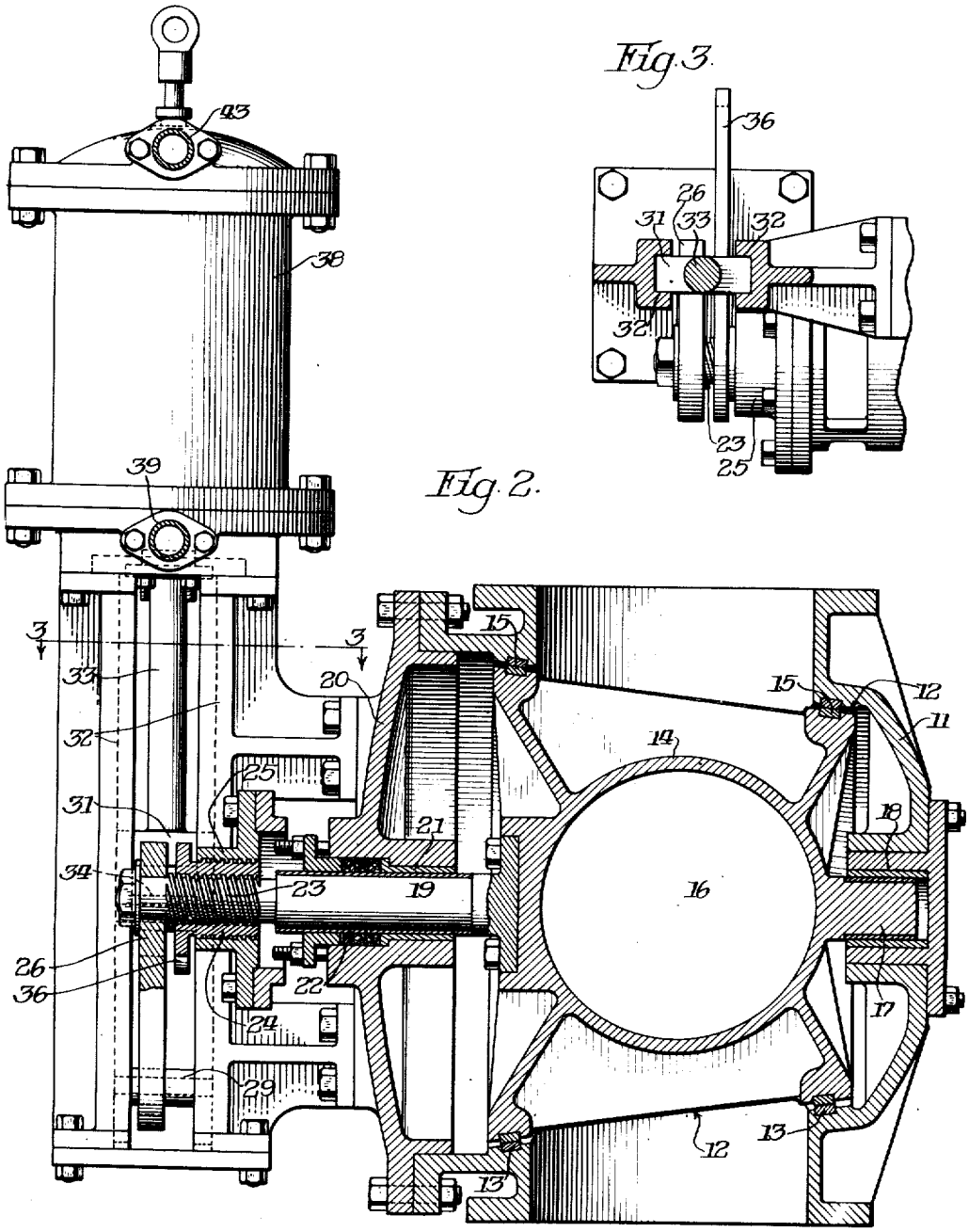
Inventor:
David D. Goldberg
By Walter M. Gulley
Atty.

Sept. 17, 1935. D. D. GOLDBERG Re. 19,703

VALVE

Original Filed June 21, 1928 4 Sheets-Sheet 3

Inventor.
David D. Goldberg
By Walter M. Fully
Atty

Sept. 17, 1935. D. D. GOLDBERG Re. 19,703

VALVE

Original Filed June 21, 1928 4 Sheets-Sheet 4

Inventor
David D. Goldberg
By Walter M. Fuller
Atty.

Reissued Sept. 17, 1935

Re. 19,703

UNITED STATES PATENT OFFICE 19,703

VALVE

David D. Goldberg, Springfield, Mass., assignor to Automatic Cone Valve Company, Mattoon, Ill.

Original No. 1,890,678, dated December 13, 1932, Serial No. 287,141, June 21, 1928. Application for reissue July 16, 1935, Serial No. 31,747

27 Claims. (Cl. 137—139)

My present invention relates to valves and their operating means and concerns more particularly, but not necessarily exclusively, certain features of betterment in comparatively large, power-operated valves, such as are used in the piping systems supplying communities with water.

To enable those skilled in this art to have a full and complete understanding of the invention, both from structural and functional standpoints, in the accompanying drawings, forming a part of this specification, I have illustrated a present, preferred embodiment of the invention, and, for simplicity, like parts of the mechanism have been designated by the same reference characters throughout the several views.

In these drawings:

Fig. 2 is a central, vertical section through the main-valve;

Fig. 3 is a horizontal section on line 3—3 of Fig. 2;

Figure 1:
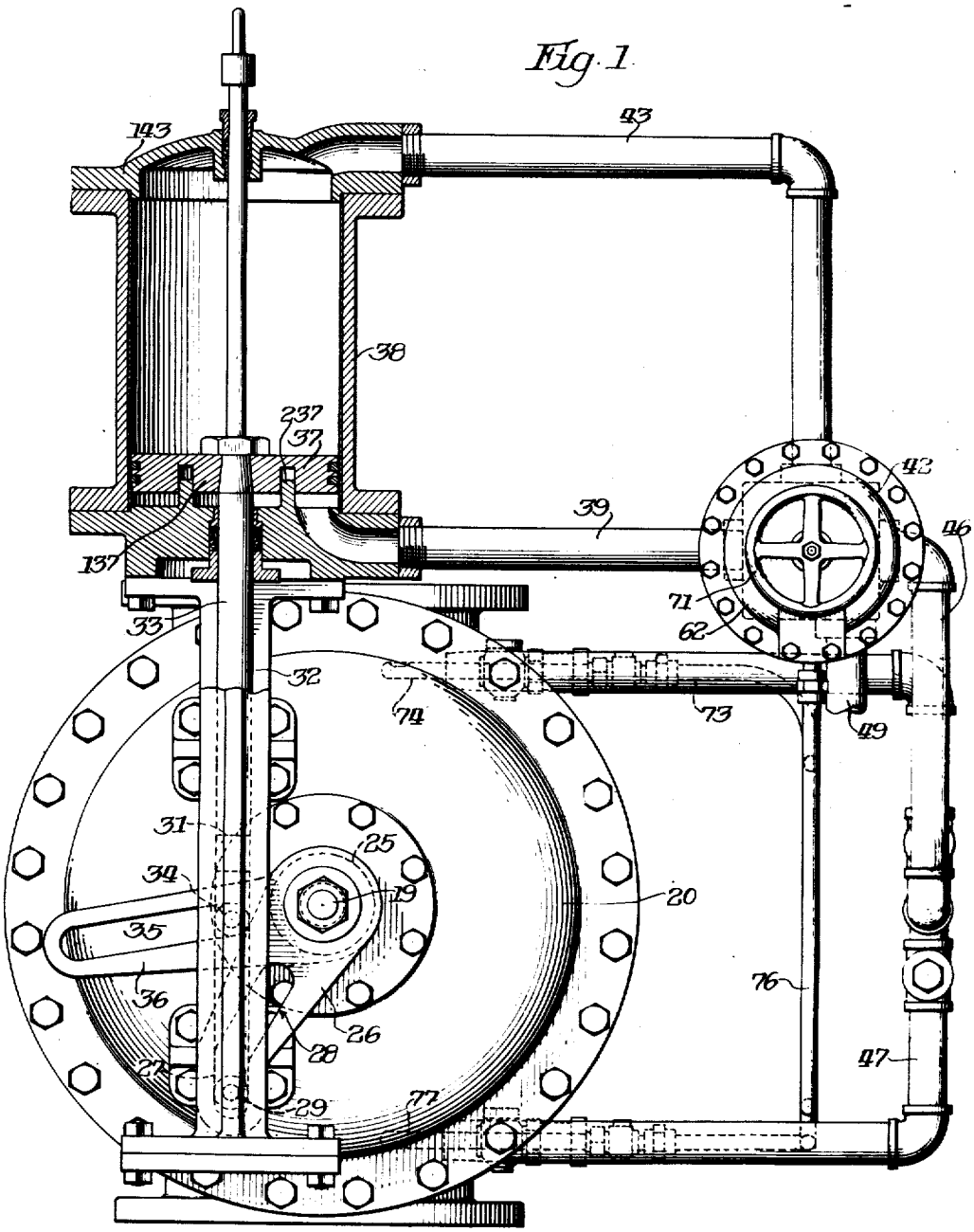
Fig. 1 is an elevation of the appliance with the power cylinder and piston shown in section.
Figures 4, 8:
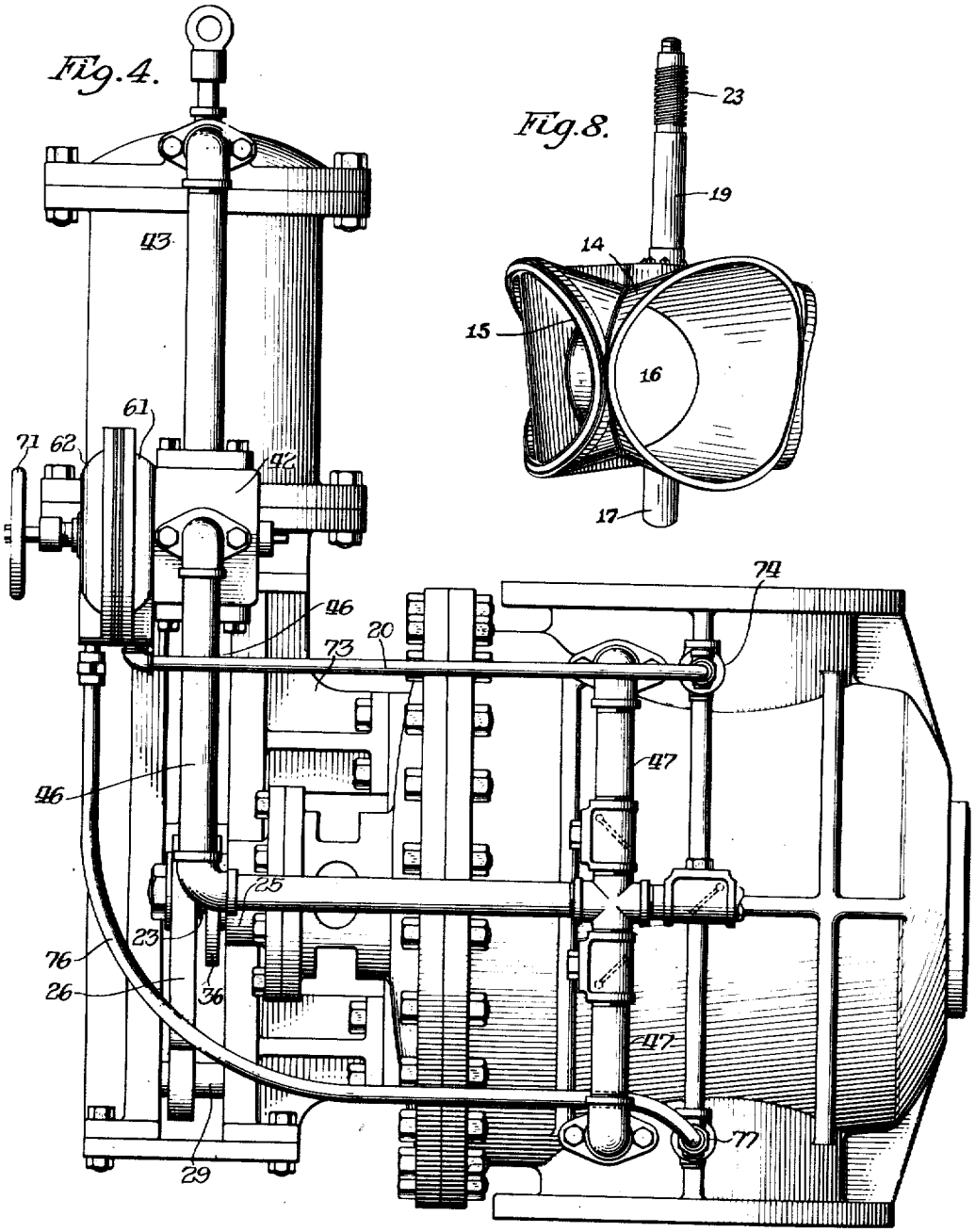
Fig. 4 is an elevation of the valve at right-angles to the view shown in Fig. 1.
Fig. 8 is a perspective view of the cone-plug of the valve.

Referring to these drawings, it will be observed that the main-valve comprises a casing or housing 11 adapted to be connected to the piping system in the usual way, such casing having a conical valve-seat 12 fitted with suitable wear-resisting or sealing-rings 13, 13.

The conical valve 14 is equipped with complementary rings 15, 15, it has a central passage 16 therethrough adapted to connect the inlet and outlet of the casing or to be turned crosswise such conduit to close the valve, and it is fitted with a trunnion 17 adapted to turn and slide in a bearing 18, the stem 19 of the valve being similarly mounted in a bearing 21 in the valve-casing cover 20 and fitted with a stuffing-box 22 to prevent leakage around the stem.

The cooperating war-resisting or sealing-rings 13 and 15 are more or less of elliptical shape and are relatively narrow, in fact their shape more nearly approximates the intersection of a cylinder and a cone.

The outwardly, projecting part 23 of the valve stem is screw-threaded and it fits in and cooperates with the internal right-hand threads of a nut or threaded sleeve 24, the external left-hand threads of which coact with the internal threads of a stationary-member 25 mounted on the valve-casing in any approved manner.

Valve-stem 19—23 at its end has a slotted arm 26 fixed thereon so that rocking of the arm will cause a corresponding actuation of the valve-stem and valve; the slot comprising an outer portion 27 and an inner portion 28 arranged radially to the axis of the valve, the two sections of the slot being disposed at a distinct angle to one another, as illustrated.

Such slot accommodates a roller 29 carried by a bifurcated cross-head 31 slidable in parallel guideways 32, 32, by a piston-rod 33 on which it is mounted, the cross-head carrying a second roller 34 occupying, in the present instance, a straight, radially-disposed slot 35 in an arm 36 forming part of the double-threaded sleeve or nut 24, although such slot need not necessarily be straight.

As is fully shown, the piston-rod is equipped with a power-piston 37 slidable in a power-cylinder 38.

Assuming that the valve is closed with the parts as shown in Figs. 1 and 2, the slot-section 27 being then parallel to the straight line path of travel of roller 29, when the piston, piston-rod and cross-head and its rollers travel upwardly, arm 36 swings upwardly and the double-threaded nut turns about its axis.

During the first thirty degrees, swing of the arm and nut, the other arm 26 and the associated valve do not turn, because the roller 29 merely travels up the portion 27 of the slot without moving the arm.

Such thirty degrees' swing of the arm 36, by reason of the combined or conjoint action of the left-hand threaded connection of the nut or sleeve 24 with the stationary element 25 and the right-hand threaded connection of the nut with the valve-stem, causes an outward bodily, non-rotative movement of the valve directly away from its seat, after which it is capable of rotation without frictional contact with such tapered seat.

Continued upward travel of the cross-head and its rollers rotates the nut forty-five degrees further, though less rapidly because the roller is then moving in that part of slot 35 more remote from the axis of the valve.

At the beginning of such further travel of the cross-head, the roller 29 will be at the bend of its compound slot 27, 28, so that as roller 29 continues its upward travel, arm 26 will be swung ninety degrees in a clockwise direction, turning the valve in like degree in the same direction to its full open position.

During such simultaneous turning of the two arms 36 and 26, the former has an angular velocity less than that of the arm 26, because in the one case, the roller 34 is moving in the outer part of the slot 35, whereas the roller 29 is traveling at the same time in the inner portion of its slot 28 with a decreasing leverage on the valve in accordance with the lessening work of opening the valve.

In the particular embodiment of the invention presented, the arm 36 turns thirty degrees to back the valve away from its tapered seat by reason of the double thread connection of the nut 24, during which operation arm 26 does not move, because, for the time of that period, its roller is traveling directly upwardly in the then vertically disposed part 27 of its slot.

Immediately thereafter, while the arm 36 swings up an additional forty-five degrees, the other arm 26 makes its complete swing of ninety degrees.

During such conjoint or combined upward movement of the two arms, the turning of arm 36 tends to shift the valve still further from its seat and the swinging of arm 26 serves to feed it toward its seat, the actual result being that at the termination of such simultaneous turning of the arms, the valve, with relation to its distance from its seat, is practically where it was at the institution of such conjoint arm movements.

When the piston and cross-head descends, the reverse of the stated actions occurs and the valve is closed by first turning ninety degrees through an increasing leverage in conformity with the progressively greater work to be done to bring its passage out of register with the valve-casing openings and then moving bodily inwardly on to its tapered seat.

Referring now to the means for actuating or reciprocating the power-piston 37 in its cylinder, it will be observed that the lower end of the latter, below the piston, is joined by a pipe 39 to a chamber 41 in the side of a control-valve, characterized 42 as a whole, the upper end of the cylinder being similarly connected by a pipe 43 to a chamber 44 in the top part of such control-valve.

Another side chamber 45 in the control-valve is united by a pipe 46 to a pipe connection 47 in communication with the inside of the main-valve casing 11 at opposite sides of the valve, so that there is always certainty of water or other liquid under pressure to actuate the valve-operating mechanism.

The control-valve has a lower compartment 48 supplied with a delivery-pipe 49 connected to the sewer or other appropriate drain means.

Figure 5:
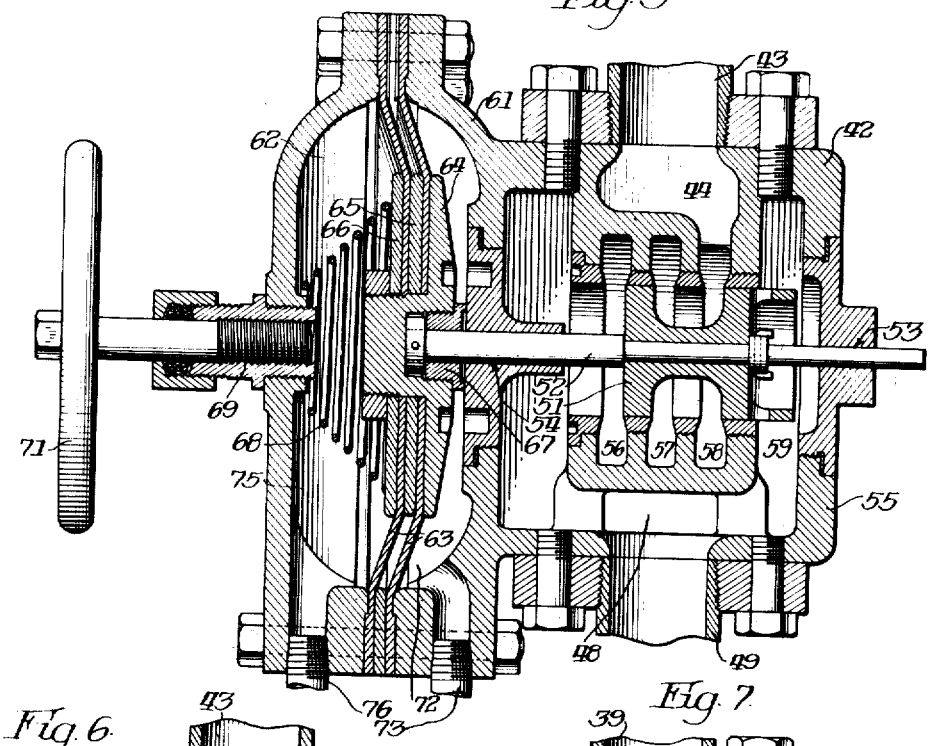
Fig. 5 is a vertical section through the control-valve mechanism.
Figure 6:
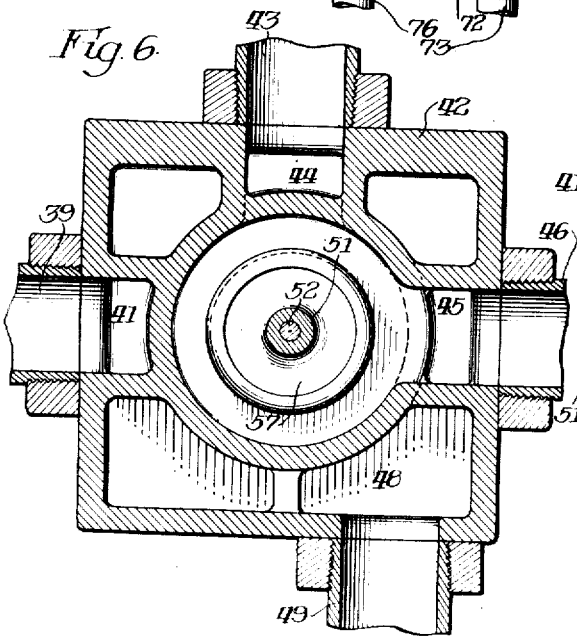
Fig. 6 is a vertical section on line 6—6 of Fig. 5.
Figure 7:
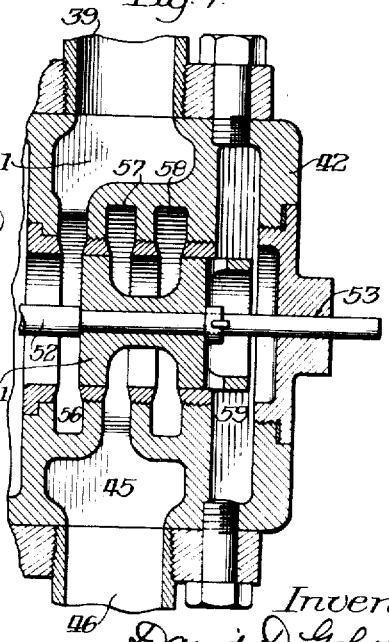
Fig. 7 is a horizontal fragmentary section through the center of the control-valve.

As is shown in Figs. 5, 6 and 7, the several specified chambers in the control-valve are directly connected by suitable passages to a corresponding number of circular cavities constituting ports cooperating with a sliding valve 51 mounted on a reciprocatory valve-stem 52 slidable in bearings 53, 54 in the control-valve casing or housing 55.

More specifically, chamber 41 is connected to the port or annular cavity 56, 45 to 57, 44 to 58 and 48 to 59.

An enlargement 61 of the housing 55 forms a compartment 62 which accommodates a double, flexible diaphragm 63, the margin or border of which is clamped between separable parts of the casing 61, the central section of the diaphragm being stiffened against flexure by discs 64, 65, and 66 secured together through apertures in the diaphragm and the middle disc, the middle section of such united diaphragm and discs being directly connected at 67 to that portion of the valve-stem 52 which protrudes into the space 62.

A coiled spring 68 in compartment 62 presses against the inner surface of the housing 61 and against that face of the duplex diaphragm remote from the control-valve 51 and tends to shift the latter to its right-hand position, as the mechanism is viewed in Fig. 5, and, in addition, a hand-operating screw 69, equipped with an accessible, external hand-wheel 71, extends through the compartment wall 61 and is capable of engaging the diaphragm and manually shifting the valve to the same designated position.

When the diaphragm is flexed to position valve 51 in its right-hand location, the water under pressure enters the valve-casing through pipes 47 and 46 and flows from chamber 45 through port 57 and valve 51 into port 58 and out through chamber 44 and pipe 43 into the upper part of the power-cylinder 38 where it will force the piston down to close the main-valve, but, in order that the piston may so move, the water below it must freely escape and this occurs through the connected passages 39, 41, 56, 48 and 49, finding its way to the sewer or other drain.

On the other hand, when the diaphragm is bowed in the opposite direction and carries the valve 51 to its left-hand position, the water under pressure flows through the passages 47, 46, 45, 57, 51, 56, 41, 39 into the cylinder 38 below, and causing the rise of, piston 37 and the opening of the main-valve 14, the water above piston 37 escaping into the sewer through the connected conduit means 43, 44, 58, 59, 48 and 49.

From the foregoing, it will be clear that the flexing of the diaphrgam controls the power operation of the main, conical valve, but the latter may be brought to closed position, yet not to open position, by turning in the screw 69 by its hand-wheel 71, thus compelling the diaphragm to flex to the right.

In order that the control-valve may be operated automatically by a pitometer associated with the water-piping system in which the main-valve is employed, that portion 72 of chamber 62 on one side of the diaphragm is connected by a pipe 73 to a Pitot tube 74 in the valve-casing at one side of the main-valve 14, and, in similar manner, that part 75 of chamber 62 on the opposite side of the diaphragm is connected by a pipe 76 to a second Pitot tube 77 in the valve-casing on the opposite side of the main-valve, the two Pitot tubes facing in opposite directions in accordance with the usual practice.

Such main-valve may be either closed or open with the water flowing through it in either one or the other direction, or just stopping to reverse, and, whatever the condition of the water may be, it will affect the Pitot tubes accordingly.

Assuming that a pump, not shown, which forces the water through the main-valve is stopped, so that the pumping action is substantially reduced or ended, with corresponding change of water velocity through the valve, such modification of water travel would affect the Pitot tubes and change the pressure of the water on the two sides of the diaphragm.

Since the position of the control-valve is determined by the difference of pressure on the two sides of the diaphragm, when the velocity of the water passing through the main-valve changes as above-specified, the difference in pressure changes, and, if this is adequate in amount, the diaphragm will flex in the opposite direction and shift the control-valve to cause the closure of the main-valve.

In a general way, the main-valve would not start to close until the flow of water through it had reversed and the closing of the valve would tend to produce an objectionable water-hammer, and, it is, therefore, desirable to so construct and arrange the control-valve mechanism that it will close the main-valve before the direction of water-flow therethrough reverses, the ideal point or condition being to close the valve just when the water flow is stopping preliminary to reversal and thus eliminate water-hammer.

This result is accomplished by reason of the unbalanced total liquid pressures on the two sides of the diaphragm, even though the liquid pressures on its two sides are the same per unit area, because the cross-sectional area of the rod 52 is deducted from the area of one side of the diaphragm.

Hence, with equal unit pressures on the two sides of the diaphragm, such as would occur if the main cone valve were open and the water therein quiescent, the diaphragm would be flexed to the right, as shown in Fig. 5, and would cause the closing of the main valve.

This normal pressure unbalance of the diaphragm is desirably augmented by the employment of spring 66.

It is not essential that the spring be employed for this purpose, but in order to standardize the structures and not vary the diameter of the valve rod 52, the spring is used to compensate for the lack or absence of sufficient cross-sectional area of such rod, to accomplish the desired object.

While it is true that, in order to have the least amount of water-hammer, there should be no reversal of flow in the pipe line, and, even though the valve functions comparatively quickly, there is an element of time consumed in its closing action, and, accordingly, in order that the valve may be completely closed before any reversal occurs, the mechanism is so constructed that the valve closing is initiated at a predetermined forward velocity of the water, and, by installing a spring 66 of the required capacity, the desired result is easily accomplished.

Should the pump be started again, the pressure on the inlet side Pitot tube will gradually increase while the pressure in the companion Pitot tube would not be modified, and hence the difference in pressures on the two sides of the diaphragm would be gradually increased sufficiently to overpower the spring and cause the control valve to shift to position to open the main-valve.

From what precedes, the manner in which the appliance acts as a check-valve will be obvious.

Sometimes it is desirable to close the valve by hand either partially or fully and such manual operation must never interfere with the readiness or capacity of the valve to close automatically at any moment in case of emergency.

This result may be accomplished by the hand-operated screw 69 which is capable of forcing the control-valve to main-valve closing position in spite of the liquid pressures on opposite sides of the diaphragm.

A feature of construction which in some installations is desirable or of importance, comprises means to cushion the descent of the power-piston in its cylinder and its associated movable elements and also to seal the top of the cylinder by the piston itself when at its topmost limit of movement.

Accordingly, the piston 37 may be formed to provide a short, smaller, supplemental piston 137 adapted when the main piston is almost at its lowest position to enter a short, open-ended, secondary cylinder 237 formed as a part of the lower cylinder-head.

As the piston descends a small amount of water is trapped in such auxiliary cylinder and acts as a cushion, the water gradually squeezing or leaking out to give the operation of the structure the needed cushioning effect.

When the piston reaches its upper limit of travel it engages the inwardly-overhanging flange of the top cylinder-head 143 and thus seals the water therein and, in large measure, prevents its gradual escape past the piston.

Owing to the fact that the conical plug 14 during the opening of the valve moves first axially and then turns and in closing turns and then travels axially, there is no substantial wear on the rings 13 and 15, because there is no relative rotation between them. Further they perform their effective sealing action only while the valve is closed. Valves of this general type when in closed condition tend to stick or adhere to their seats and this tendency is more or less proportional to the area of their contacting surfaces. The operation of the new valve is such that it permits the employment of narrow sealing-rings and hence this objectionable tendency is largely reduced.

Those acquainted with this art will readily understand, that, the invention, as defined by the appended claims, is not limited and restricted to the precise and exact details of structure presented and that many more or less radical mechanical changes may be incorporated in the structure without departure from the heart and essence of the invention and without the loss or sacrifice of any of its material or substantial benefits and advantages.

I claim:

1. In a valve-structure, the combination of a valve-casing having a valve-seat, a valve cooperating with said valve-seat and mounted in said casing with capacity for bodily movement toward and from said seat and for turning on its own axis to open and close the valve, a screw-threaded stem for said valve, a stationary screw-threaded member, a double-threaded nut having screw-threads cooperating with those of said stem and those of said member, and power means to turn said nut to retract said valve from said valve-seat and to turn said valve-stem to rotate said valve after such retraction.

2. In a valve-structure, the combination of a valve-casing having a valve-seat, a valve cooperating with said valve-seat and mounted in said casing with capacity for bodily movement toward and from said seat and for turning on its own axis to open and close the valve, a screw-threaded stem for said valve, a stationary screw-threaded member, a double-threaded nut having screw-threads cooperating with those of said stem and those of said member, and power means to turn said nut alone to retract said valve from its valve-seat and subsequently to turn said valve-stem to rotate said valve during continued turning of said nut.

3. In a valve-structure, the combination of a valve-casing having a valve-seat, a valve cooperating with said valve-seat and mounted in said casing and capacity for bodily movement toward and from said seat and for turning on its own axis to open and close the valve, a screw-threaded stem for said valve, a stationary screw-threaded member, a double-threaded nut having screw-threads cooperating with those of said stem and those of said member, a slotted arm connected to said nut by which the latter may be turned to retract said valve from its seat, a slotted arm connected to said valve-stem by which said valve may be rotated through said valve-stem, and power actuated means engaging in the slots of said arms to operate the latter.

4. In a valve-structure, the combination of a valve-casing having a valve-seat, a valve co-operating with said valve-seat and mounted in said casing with capacity for bodily movement toward and from said seat and for turning on its own axis to open and close the valve, a screw-threaded stem for said valve, a stationary screw-threaded member, a double-threaded nut having screw-threads cooperating with those of said stem and those of said member, an arm with a substantially straight slot connected to said nut by which the latter may be turned to retract said valve from its seat, an arm with an angle-shaped slot connected to said valve-stem by which said valve may be rotated through said valve-stem, and power actuated means engaging in the slots of said arms to rock the first arm alone initially and subsequently to rock both arms simultaneously, whereby the valve is first retracted from its seat and then turned on its own axis.

5. The combination of a valve-casing having a passage therethrough and a conical valve-seat, a cone valve in said casing cooperating with said seat and adapted to open and close said passage, power-operated means movable only in a straight line, and means connecting said power-operated means and said valve causing the latter during its opening movement to travel bodily away from said seat in a straight line and then turn and to reverse such movements during the closing of the valve.

6. The combination of a valve-casing having a passage therethrough and a conical valve-seat, a cone valve in said casing cooperating with said seat and adapted to open and close said passage, power-operated means movable in a straight line, and means connecting said power-operated means and said valve causing the latter during its opening movement to travel bodily away from said seat in a straight line and then turn and to reverse such movements during the closing of the valve, such straight line movements of said valve and power-operated means being at right angles to one another.

7. In a valve-structure, the combination of a valve-casing having a passage therethrough and a conical valve-seat, a conical valve in said casing cooperating with said valve-seat and adapted to turn to open and to close said passage, and means to operate said valve including screw-threaded means, said valve during its initial opening movement traveling axially only away from said valve-seat by reason of the valve-withdrawing action of said screw-threaded means, and then rotating, the valve during such rotation and by reason of the action of said screw-threaded means traveling further away from said valve-seat and then approaching said valve-seat, the reverse of said valve movements occurring during the closing of the valve.

8. In a valve-structure, the combination of a valve-casing having a passage therethrough and a conical valve-seat, a ported conical valve in said casing cooperating with said valve-seat and movable to open and to close said passage, and actuating-means acting, during the opening of the valve, to slide the valve initially bodily axially away from the valve-seat in a substantially-straight line through a varying leverage and then to turn the valve, and, during the closing of the valve, first to turn the valve and then through said varying leverage to slide the valve bodily axially in a substantially-straight line to said valve-seat.

9. The structure presented in claim 8 in which said varying leverage increases during the opening sliding of the valve and decreases during the closing sliding of the valve.

10. The structure presented in claim 8 in which said actuating-means includes a varying leverage means through which the opening and closing turning movements of the valve are executed.

11. The structure presented in claim 8 in which said varying leverage increases during the opening sliding of the valve and decreases during the closing sliding of the valve and in which said actuating-means includes a varying leverage means through which the opening and closing turning movements of the valve are executed.

12. The structure presented in claim 8 in which said actuating-means includes a leverage means through which the opening and closing turning movements of the valve are executed and the leverage of which decreases during at least the major portion of such opening turning of the valve and increases during at least the major portion of the closing turning of the valve.

13. The structure presented in claim 8 in which said varying leverage increases during the opening sliding of the valve and decreases during the closing sliding of the valve and in which said actuating-means includes a leverage means through which the opening and closing turning movements of the valve are executed and the leverage of which decreases during at least the major portion of the opening turning of the valve and increases during at least the major portion of the closing turning of the valve.

14. In a valve-structure, the combination of a valve-casing having a passage therethrough and a conical valve-seat, a ported conical valve in said casing cooperating with said valve-seat and movable to open and close said passage, and actuating-means acting, during the opening of the valve, to slide the valve initially bodily axially away from the valve-seat in a substantially-straight line and then to turn the valve through a varying leverage and acting, during the closing of the valve, first to turn the valve through such varying leverage and then to slide the valve bodily axially to the valve-seat in a substantially-straight line.

15. In a valve-structure, the combination of a valve-casing having a passage therethrough and a conical valve-seat, a ported conical valve in said casing cooperating with said valve-seat and movable to open and to close said passage, and actuating-means acting, during the opening of the valve, to slide the valve initially bodily axially away from the valve-seat in a substantially-straight line and then to turn the valve through a leverage decreasing during at least the major portion of the opening turning of the valve and acting, during the closing of the valve, first to turn the valve through said leverage which increases during at least the major portion of the closing turning of the valve, and then to slide the valve bodily axially to the valve-seat in a substantially-straight line.

16. The structure presented in claim 8 in which said actuating-means while effecting the opening and closing turning movements of the valve also moves the valve axially.

17. The structure presented in claim 14 in which said actuating-means while effecting the opening and closing turning movements of the valve also moves the valve axially.

18. The structure presented in claim 15 in which said actuating-means while effecting the opening and closing turning movements of the valve also moves the valve axially.

19. The structure presented in claim 8 in which said actuating-means while effecting the opening turning of the valve also moves the valve further from the valve-seat and then toward the valve-seat.

20. In a valve-structure, the combination of a valve-casing having a passage therethrough and a conical valve-seat, a ported conical valve in said casing cooperating with said valve-seat and movable to open and to close said passage, operating-means, means connected to said operating-means to slide said valve bodily axially toward and from said seat and acting during the opening of the valve to unseat the valve and then partially reseat it, and means connected to said operating-means to rotate said valve, after its initial unseating, during the continuance of its unseating and during its partial reseating, the reverse of such action occurring during the closing of the valve.

21. In a valve-structure, the combination of a valve-casing having a passage therethrough and a conical valve-seat, a conical valve in said casing cooperating with said valve-seat and adapted to open and to close said passage, power-operated means movable in a straight line at an angle to the axis of said valve, and means between and connecting said power-operated means and said valve to move the latter during its opening movement first solely axially directly away from said valve-seat in a substantially-straight line and then to turn the valve, and during the closing movement of said valve first to turn the valve and then move it solely axially directly to said valve-seat in a substantially-straight line.

22. In a valve-structure, the combination of a valve-casing having a passage therethrough and a conical valve-seat, a ported conical valve in said casing cooperating with said valve-seat and movable to open and to close said passage, operating-means, means connected to and actuated by said operating-means to initially unseat said valve during the opening of the valve by sliding the valve bodily axially away from said valve-seat, and means connected to and actuated by said operating-means and acting during the opening of the valve to lock the valve against rotation during such initial unseating and then to turn the valve, the reverse of such action occurring during the closing of the valve.

23. In a valve-structure, the combination of a valve-casing having a passage therethrough and a conical valve-seat, a ported conical valve in said casing cooperating with said valve-seat and movable to open and close said passage, operating means, and means connecting said operating means to said valve, said connecting means during the opening of said valve sliding the valve bodily axially away from said valve-seat in a substantially-straight line and then rotating the valve through a leverage decreasing during at least the major portion of such rotation, each successive increment of movement of said operating means increasing the area of aperture of the valve opening in substantial proportion to the decrease of leverage in the connecting-means, the reverse of such action occurring during the closing of the valve.

24. The combination of a main-valve and its casing, power-cylinder means, power-piston means reciprocatory in said cylinder means, means connecting said piston means and main-valve whereby the movements of the former may open and close the latter, and a control-valve connected to a source of power and to said power-cylinder means, and hydraulically operated means responsive to a difference in static pressures on opposite sides of said main valve acting to move the control valve into position to effect opening of the main valve when the static pressure on the upstream side of said main valve is greater, said hydraulically operated means being also responsive to a change in fluid velocity through said valve casing and acting upon a decrease in said fluid velocity to move the control valve into position to effect closure of the main valve whereby the initiation of the opening of said main-valve is effected solely by the static pressure of the fluid in said valve-casing, the inauguration of the closing of said valve is controlled substantially solely by the velocity of the fluid in said valve-casing.

25. The combination of a main-valve and its casing, power-cylinder means, power-piston means, power-piston means reciprocatory in said cylinder means, means connecting said piston means and main-valve whereby the movements of the former open and close the latter, a control-valve connected to a source of power and to said power-cylinder means, a chambered-member, movable means in said chamber dividing it into two compartments, means governing the action of said control valve by said chamber-dividing means, and tubes connected to said chamber on opposite sides of said movable member and connected to said valve-casing on opposite sides of said main-valve, said tubes being capable of transmitting the static pressures on opposite sides of the main valve to opposite sides of said movable member, the tube connected to the discharge side of the main valve being provided with means responsive to the velocity of the fluid in the valve casing to vary the effective pressure on that side of the movable member to which it is connected inversely with said discharge fluid velocity whereby the initiation of the opening of said main-valve is effected solely by the static pressure of the fluid in said valve-casing, the inauguration of the closing of said valve is controlled substantially solely by the velocity of the fluid in said valve-casing.

26. The combination with a conduit of a main valve for opening and closing said conduit, a power cylinder, a power piston reciprocatory in said cylinder, means connecting said piston and main valve whereby the movements of the former open and close the latter, a control valve connected to a source of power and to said power cylinder, a chamber, a movable member in said chamber dividing it into two compartments, means governing the action of said control valve by said chamber dividing member, and tubes connected to said chamber on opposite sides of said movable member and connected to said conduit on opposite sides of said main valve, said tubes being capable of transmitting the static pressures on opposite sides of the main valve to opposite sides of said movable member, the tube connected to the discharge side of the main valve being provided with means responsive to the velocity of the fluid to vary the effective pressure on that side of the movable member to which it is connected inversely with the velocity of fluid discharged from said main valve, and spring means acting on said movable member for augmenting the pressure transmitted by the tube connected to the discharge side of the main valve in moving said movable member to main valve closing position.

27. The combination with a conduit of a main valve for opening and closing said conduit, a power cylinder, a power piston reciprocatory in said cylinder, means connecting said piston and main valve whereby the movements of the former open and close the latter, a control valve connected to a source of power and to said power cylinder, a chamber, a movable member in said chamber dividing it into two compartments, means governing the action of said control valve by said chamber dividing member, and tubes connected to said chamber on opposite sides of said movable member and connected to said conduit on opposite sides of said main valve, said tubes being capable of transmitting the static pressures on opposite sides of the main valve to opposite sides of said movable member, the tube connected to the outgoing side of the main valve being provided with means responsive to the velocity of the fluid in the conduit to decrease the effective pressure on that side of the movable member to which it is connected as the fluid velocity increases and to increase said effective pressure as the fluid velocity decreases, the tube connected to the ingoing side of the main valve being provided with means responsive to the velocity of the fluid in the conduit to increase the effective pressure on that side of the movable member to which it is connected as the fluid velocity increases and to decrease said effective pressure as the fluid velocity decreases.

DAVID D. GOLDBERG.